United States Patent [19]

Bremer

[11] Patent Number: 4,573,275

[45] Date of Patent: Mar. 4, 1986

[54] ARRANGEMENT FOR THE MOUNTING OF MEASURING DEVICES OF AXLE MEASUREMENT EQUIPMENTS

[75] Inventor: Güenter Bremer, Bondorf, Fed. Rep. of Germany

[73] Assignee: Daimler-Benz Aktiengesellschaft, Fed. Rep. of Germany

[21] Appl. No.: 607,598

[22] Filed: May 7, 1984

[30] Foreign Application Priority Data

May 7, 1983 [DE] Fed. Rep. of Germany ....... 3316869

[51] Int. Cl.$^4$ ..................... G01B 7/315; G01B 11/275
[52] U.S. Cl. ................................. 33/288; 33/203.18; 356/155
[58] Field of Search ....... 33/174 L, 180 AT, 181 AT, 33/203.15, 203.16, 203.18, 203.19, 288, 299, 336, 337; 356/155

[56] References Cited

U.S. PATENT DOCUMENTS

| 2,189,394 | 2/1940 | Fried | 33/203.19 |
| 3,696,513 | 10/1972 | Sullivan | 33/174 L |
| 3,724,084 | 4/1973 | McNeece | 33/174 L |
| 3,951,551 | 4/1976 | Macpherson | 356/155 |
| 3,969,713 | 7/1976 | Bossler, Jr. | 33/174 L |
| 4,011,659 | 3/1977 | Hörvallius | 33/203.18 |
| 4,151,655 | 5/1979 | Makarainen | 33/203.18 |
| 4,233,745 | 11/1980 | Ramon et al. | 33/174 L |

FOREIGN PATENT DOCUMENTS 1264789 3/1968 Fed. Rep. of Germany.
1095692 12/1967 United Kingdom.

Primary Examiner—Richard R. Stearns
Attorney, Agent, or Firm—Craig & Burns

[57] ABSTRACT

An arrangement for mounting measuring devices of axle measurement equipment with a fastening plate that is adapted to be installed at the vehicle wheel aligned parallel to a flat reference surface of the vehicle axle by means of abutment pins extending through the wheel disk by way of through-openings. An incorrect alignment of the plane of the fastening plate which causes an incorrect adjustment of camber, toe-in or caster, is avoided with a completely satisfactory abutment of all abutment pins at the reference surface. Unevennesses of the reference surface or especially foreign bodies disposed between the contact surfaces of the abutment parts, such as, for example, metal shavings, will be recognized if a voltage is applied between the respective electrically conducting but mutually insulated abutment pins and the vehicle part carrying the reference surface, and if current, voltage or contact resistance is measured between the electrical connections by means of an electrical measuring device connected in the circuit.

5 Claims, 2 Drawing Figures

U.S. Patent     Mar. 4, 1986     4,573,275
FIG. 1
FIG. 2
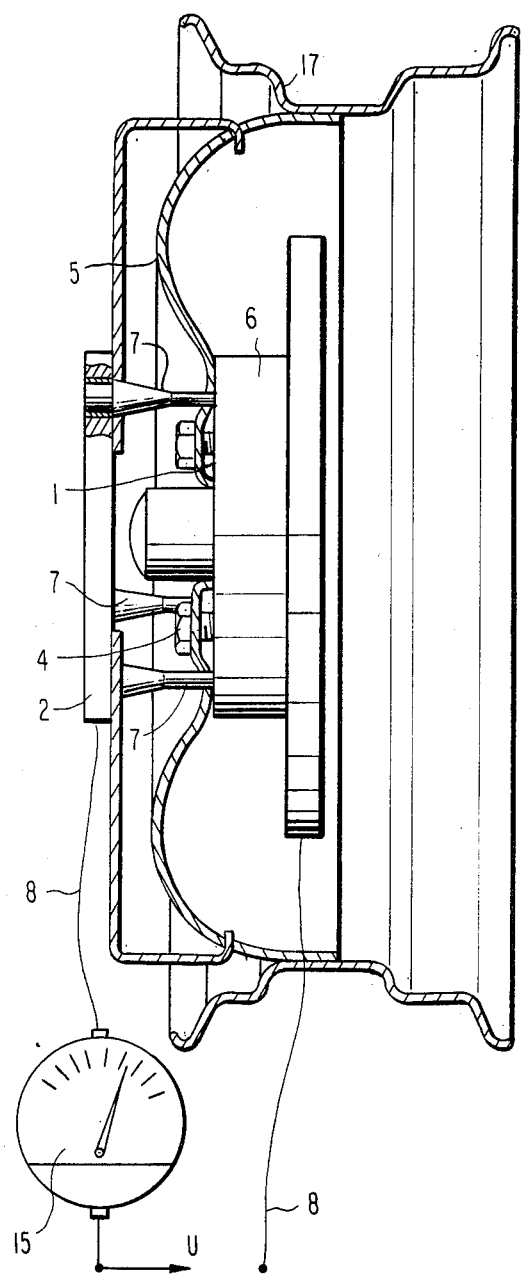
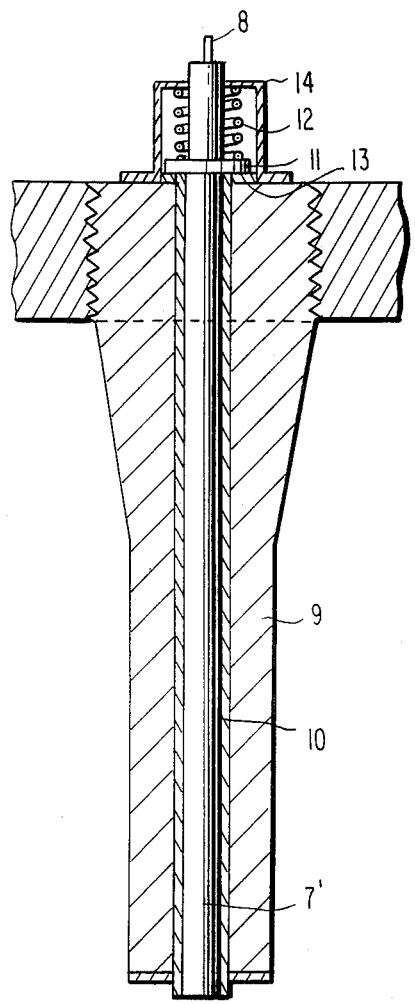

ARRANGEMENT FOR THE MOUNTING OF MEASURING DEVICES OF AXLE MEASUREMENT EQUIPMENTS

The present invention relates to an arrangement for the mounting of measuring devices of axle measurement equipment as disclosed, for example, in the German Pat. No. 12 64 789.

For the alignment of the steerable wheels of motor vehicles with respect to camber, toe-in and caster, measuring devices of axle measurement equipment, as are represented, for example, by measurement mirrors, must assume a position accurately defined with respect to a vehicle part. The prior art installation includes a fastening plate for the mounting of the measuring devices. The alignment of the plane of the fastening plate takes place parallel to the plane of the outer surface of the respective brake drum of the wheel at a distance by means of abutment pins securely connected with the fastening plate. In order that the end faces of the abutment pins are able to abut at the flat-machined reference wheel surface hub without having to disassemble the vehicle wheel, the wheel disk is provided with correspondingly constructed bores, through which extend the abutment pins. Legs with hook-shaped ends take over the fastening of the installation at the wheel which extend about apertures of the wheel disk and are connected with the fastening plate. In this manner, the measurement equipment mounted on the fastening plate is retained supported on the brake drum or the wheel hub. It is thereby disadvantageous and costly in that it is not possible in practice to control the abutment of the end faces of the contact pins on the reference surface with simple mechanical means since the abutment surface is not freely accessible. However, if the abutment of all abutment pins on the reference surface is not assured, then incorrect adjustments of camber, toe-in or caster may result therefrom when unevennesses of the reference surface are not noticed or dirt particles or metal chips are disposed between abutment pins and abutment surface or if the installation rests tilted or canted in the bore holes.

The present invention is concerned with avoiding an incorrect alignment of camber, toe-in and/or caster caused by misalignment of the plane of the fastening plate.

The underlying problems are solved according to the present invention in that the abutment pins are electrically insulated with respect to one another and are included in an electric circuit with a signal generator which produces a corresponding release signal only with a completely satisfactory mechanical abutment of all abutment pins at the reference surface. As a result thereof, the completely satisfactory abutment of all abutment pins of the fastening plate of a measuring device can be controlled. The abutment pins are electrically insulated with respect to one another so that current can flow by way of electrical connections at the abutment pin and the vehicle part serving as abutment part only if the abutment pin contacts the reference surface. With a completely satisfactory mechanical abutment of all abutment pins at the reference surface, an electrical signal generator produces a corresponding release signal for carrying out the axle alignment operations. Since, with installations having four or more abutment pins, slight unevennesses of the abutment surface which are tolerable during the axle alignment lead to the fact that one or more abutment pins do not contact the reference surfaces, the abutment pins may be constructed so as to be longitudinally displaceable within certain limits relative to the fastening plate against the force of an abutment spring. Installations equipped with at least four abutment pins will permit the recognition of current-conducting unevennesses such as, for example, metal chips or shavings, since at least one of the abutment pins loses the contact with the reference surface.

It is advantageous with the present invention that existing measuring devices can be correspondingly refitted without excessive expenditure, and a considerably greater measuring safety can be obtained thereby. Under certain circumstances, considerable expenditures can be avoided with a corresponding measuring device, which were caused by incorrectly aligned vehicle wheels. The control installation itself and also the abutment control require only a minimum of expenditure so that practically no costs for work-time and material will result.

These and other objects, features and advantages of the present invention will become more apparent from the following description when taken in connection with the accompanying drawing which shows, for purposes of illustration only, one embodiment in accordance with the present invention, and wherein:

FIG. 1 is an axial cross-sectional view through a vehicle wheel with a fastening plate mounted at the wheel hub for measuring devices of axle-measurement equipment in accordance with the present invention; and FIG. 2 is a longitudinal cross-sectional view through an abutment pin constructed elastically longitudinally displaceable with respect to the fastening plate in accordance with the present invention.

Referring now to the drawing wherein like reference numerals are used in the two views to designate corresponding parts, a surface which has been machined flat of a structural part belonging to the axle body, for example, of a brake drum, or, in the illustrated embodiment, of the outer surface of the wheel hub 6, serves as reference surface 1 for a fastening plate 2 for the mounting of measuring devices, for example, of measurement mirrors of axle measurement equipment. In order to be able to adjust camber, toe-in or caster with least effort, and in order to be able to undertake corresponding measurements at the rolling or rotating vehicle wheel 3, the fastening plate 2 is to be attachable, as can be recognized in FIG. 1, aligned parallel to the reference surface 1, without having to loosen the fastening bolts 4 which connect the wheel disk 5 seated in the rim 17 with the wheel hub 6. For that reason, the wheel disk 5 is provided with bores, through which extend at least three or, as shown in the illustrated embodiment, five abutment pins 7 connected with the fastening plate 2. With a correct alignment of the fastening plate 2, the end faces of all five abutment pins 7 abut at the outer surface of the wheel hub 6. For retaining the fastening plate 2 at the vehicle wheel 3, for example, retaining hooks embrace additional apertures of the wheel disk 5. According to the present invention, the abutment pins 7 are insulated electrically with respect to one another so that each pin can be separately connected to a voltage source, for example, by means of a cable 8. An abutment pin guidance is illustrated in FIG. 2 whose abutment pin 7' which is constructed longitudinally displaceable in a bore, is electrically insulated with respect to the fastening plate 2. An insulating sleeve 10 is shrunk over the abutment pin 7′ in the course of the bore. Abutment surfaces of the flange 11 of the abutment pin and of the abutment spring 12 are insulated electrically by means of an insulating disk 13 and a fastening hat or cap 14 of corresponding material. In order that the bottom side of the abutment pin guidance cannot come in contact with electrically conducting parts, an insulation is also provided thereat. The wheel hub 6 is connected by way of a further cable 8 with the voltage source so that current can flow by way of the respectively connected abutment pin 7′ and the wheel hub 6. A current-measuring device 15 is connected in the electric circuit according to FIG. 1, whose scale indicates a current with a turned-on voltage source, when the respective abutment pin 7 and wheel hub 6 are in contact with one another. Whether the abutment pin 7 and the wheel hub 6 abut at one another could also be established by means of a voltage meter (not illustrated) which is connected in a parallel circuit and indicates the voltage drop between contacts at the abutment pin 7 and at the wheel hub 6. Alternatively, the contact resistance may be measured.

The adjustment of camber, toe-in or caster can take place correctly only if the plane of the fastening plate 2 is aligned exactly parallel to the reference surface 1. It is therefore necessary to control the abutment of the abutment pins 7 in the illustrated embodiment at the wheel hub 6 which, however, is not possible in practice by simple mechanical, auxiliary means because the abutment surface is not freely accessible. According to the present invention, the completely satisfactory mechanical abutment of all abutment pins is therefore controlled by means of a current, voltage or resistance measurement and the release for the axle alignment operations is indicated by means of an electrical signal generator. In case an abutment pin 7 does not contact the wheel hub, the signal generator will indicate that either no current flows or a large voltage drop or a large contact resistance exists between the contacts at the abutment pin and the wheel hub. It is particularly advantageous to select fastening plates with more than four abutment pins in conjunction with the electrical abutment control of the invention since, in case the fastening plate is attached canted or the reference surface is not plane or dirt particles or metal shavings are clamped-in between the end faces of one or more abutment pins and the reference surface, at least one abutment pin is not in contact with the outer surface of the wheel hub. In this case, also the fastening plate 2 is not aligned parallel to the outer surface of the wheel hub 6 and incorrect axle alignments would result. With the use of fastening plates whose plane is aligned with the support on only three abutment pins, the abutment control is to be carried out in principle in the same manner; however, it should be noted that with a three-leg support, all abutment pins will always support themselves on the reference surface as long as the pins do not abut canted in the through-bores of the wheel disk. Of course, current can flow by way of electrically conducting foreign bodies in front of the reference surface. However, since the current flow cross section changes, if, for example, a metal chip is disposed between an abutment pin and the reference surface, an incorrect alignment of the fastening plate can also be recognized under certain circumstances with a three-leg support by an accurate measurement, for example, of the contact resistance.

The abutment pins 7 of a fastening plate 2 may also be connected therewith in a non-yielding manner. In particular, however, when more than three abutment pins take care for the—statically non-defined—support, small acceptable unevennesses of the reference surface may lead to a slight lifting off of the one or more abutment pins and may cause the signal generator to indicate an incorrect alignment of the fastening plate. Nonetheless, in order to obtain a release signal with acceptable unevennesses, the abutment pins 7′ are constructed longitudinally displaceable against the force of a compression spring 12. The abutment pin guidance 9 which may serve itself as abutment pin with a rigid abutment pin connection at the fastening plate, accommodates the movable abutment pins. As can be seen from FIG. 2, the abutment pin 7′ is adapted to be pressed-in against the force of the abutment spring 12 by a distance corresponding to its projection at the bottom side of the abutment pin guidance. As a result of this small permissive unevennesses of the reference surface that do not impair the axle adjustments and as a result of the effect of the pressure of the abutment pins exerted by the abutment springs in the contact surface, optimum electrical current contacts are established.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An installation for the mounting of measuring devices of axle-measurement equipment, comprising a fastening plate means adapted to be secured at a vehicle wheel having a wheel disk, said fastening plate means including plural abutment pin means operable to extend through the wheel disk and abutting against a plane reference surface of the vehicle axle, each abutment pin means comprising an electrical contact pin means electrically insulated with respect to one another and with respect to the abutment pin means, said electrical contact pin means are each longitudinally displaceable in a guide means of said abutment pin means within limits against the force of abutment spring means and project slightly beyond a free end of said abutment pin means when not abutting against said surface, an electric circuit means with a signal generator means, said electrical contact pin means being included in said electric circuit means, and said signal generator means being operable to produce a clearance signal only with satisfactory mechanical abutment of all abutment pin means at the reference surface.

2. An installation for the mounting of measuring devices of axle-measurement equipment, comprising a fastening plate means adapted to be secured at a vehicle wheel having a wheel disk, said fastening plate means including electrically conducting abutment pin means operable to extend through the wheel disk and abutting against a plane reference surface of the vehicle axle, the abutment pin means being electrically insulated with respect to one another and longitudinally displaceable within limits against the force of abutment spring means, an electric circuit means with a signal generator means, said abutment pin means being included in said electric circuit means, and said signal generator means being operable to produce a clearance signal only with satisfactory mechanical abutment of all abutment pin means at the reference surface.

3. An installation according to claim 2, further comprising guide means for each abutment pin means, an insulated sleeve between the pin means and the guide means, the spring means being a compression spring normally urging the pin means to project slightly beyond the guide means and the spring means being also electrically insulated with respect to the guide means.

4. An installation according to claim 3, wherein each pin means is provided with a disk-like collar at its end opposite the projecting end, said spring means abutting, on the one hand, against said collar, and on the other, against a cap made of insulating material and prestressing the spring means.

5. An installation according to claim 4, further comprising an electrical insulation between said collar and said guide means, and an electrical insulation at the exposed surface of the guide means on the side of the projecting end of said pin means.

* * * * *